United States Patent [19]
Smith et al.

[11] Patent Number: 6,063,287
[45] Date of Patent: May 16, 2000

[54] REMOVAL OF ALGAE-ASSOCIATED ODORANTS FROM FRESH WATER

[75] Inventors: Paul K. Smith, Roscoe; Eugene P. Bergemann, Hoffman Estates, both of Ill.

[73] Assignee: Affiniti, LLC, Mt. Prospect, Ill.

[21] Appl. No.: 09/156,291

[22] Filed: Sep. 17, 1998

[51] Int. Cl.$^7$ ................................ C02F 1/28; B01J 20/22
[52] U.S. Cl. ......................... 210/691; 210/673; 210/916
[58] Field of Search .................... 210/691, 916, 210/764, 638, 639, 673, 730

[56] References Cited

U.S. PATENT DOCUMENTS

| | | | |
|---|---|---|---|
| 4,865,976 | 9/1989 | Rohrbach et al. | 435/103 |
| 5,078,886 | 1/1992 | Hsu | 210/632 |
| 5,190,663 | 3/1993 | Fetzer | 210/674 |
| 5,418,058 | 5/1995 | Li et al. | 428/327 |
| 5,425,881 | 6/1995 | Szejtli et al. | 210/747 |
| 5,547,584 | 8/1996 | Capehart | 210/764 |
| 5,591,346 | 1/1997 | Etzel et al. | 210/668 |
| 5,607,595 | 3/1997 | Hiasa et al. | 210/669 |
| 5,681,476 | 10/1997 | Grund et al. | 210/669 |

FOREIGN PATENT DOCUMENTS

| | | |
|---|---|---|
| 11116410 | 4/1999 | Japan . |
| WO 98/18722 | 5/1998 | WIPO . |
| WO 98/22197 | 5/1998 | WIPO . |
| WO 9818722 | 5/1998 | WIPO . |

OTHER PUBLICATIONS

"Cavitron ® Cyclodextrins", Cerestar USA Inc., brochure (1996).
"Formation of Complexes", Cerestar USA Inc., flyer (No Date Given).
"Cyclodextrin Complexation", Cerestar USA Inc., flyer (No Date Given).
"Cyclodextrin", Cerestar USA Inc., flyer (No Date Given).
Cyclodextrin References, Cerestar USA Inc., flyer (Aug. 1996 & Oct. 1993).
"Chemically Modified Cyclodextrins", Cerestar USA Inc., Flyer (No Date Given).
"Standard Preparative Methods for Cyclodextrin Complexes using Beta– and Hydroxypropyl Beta–Cyclodextrin", Cerestar USA Inc., Flyer (No Date Given).
"Water Purification", "Water Softening", "Water Treatment", Reference: *McGraw Hill Encyclopedia of Science & Tech.* (No Date).
"Product List", Cerestar USA Inc., Flyer, (1997).
"Musty Tastes and Odours in Water", *Maxxam Analytics, Inc.*, Article (1998).
Johnsen et al., The Uptake and Depuration of 2–Methylisoborneol (MIB) in Channel Catfish (Ictalurus Punctatus), *Agricultural Research Service—TEKTRAN*, (1998).
pH and Mg/Ca Control for Biological Treatment, Abstract (1996).
Barshick, et al., Rapid Analysis of Methylisoborneaol by Direct Sampling Ion Trap Mass Spectrometry, Abstract, (1994).
Activity of CYCLOLAB, Abstract, *Agricultural Research Service—TEKTRAN*, (1998).
This is CYCLOLAB, Abstract, *Agricultural Research Service—TEKTRAN*, (1998).
Cyclodextrin News, Abstract, *Agricultural Research Service—TEKTRAN*, (1998).
"Nanoporous Polymers Have A Thing for Organics," 32–33 (1999).

*Primary Examiner*—David A. Simmons
*Assistant Examiner*—Frank M. Lawrence
*Attorney, Agent, or Firm*—Welsh & Katz, Ltd.

[57] ABSTRACT

A process is disclosed for the removal of algae-associated odorant from fresh water by contacting such water with cyclodextrin and recovering the water so contacted.

18 Claims, No Drawings

REMOVAL OF ALGAE-ASSOCIATED ODORANTS FROM FRESH WATER

DESCRIPTION

1. Field of the Invention

The invention relates to the removal of foul smelling, bad-tasting contaminants from water, and more particularly, to the removal from fresh water of a water odorant associated with algae growth.

2. Background of the Invention

The growth of algae in sources of fresh water can result in a characteristic bad flavor and unpleasant odor of the water. The problem is most noticeable during periods of extreme algal growth. In the Midwest, these periods of peak algae growth are typically in early spring, midsummer and late fall.

Lake Michigan is a source of drinking water for millions in the Chicago metropolitan area, and is an exemplary fresh water source. In the past, the algae growth in Lake Michigan has been limited by the murkiness of the water, which allowed the light necessary for the photosynthetic algae to reach limited depths.

Starting in the 1990s, Lake Michigan became infested with the non-indigenous organism known as the zebra mussel. The zebra mussel consumes suspended light-scattering particles in Lake Michigan, making the water clearer. A result of the sunlight reaching deeper into now clearer Lake Michigan has been a more noted proliferation of algae. That algal proliferation has increased even in the relatively deeper near shore areas at which water inlets for fresh water are located.

An objectionable odor and flavor that has been called "weedy" or "musty" has been associated with this proliferation of algae.

One theory is that the algae-associated bad flavor and unpleasant odor is due to the presence of 2-methylisoborneol (MIB) secreted by algae. The chemical MIB has been detected in Lake Michigan throughout the lake, reaching higher concentrations near the shore where the water is shallower. Another odiferous candidate is geosmin.

The human nose can detect MIB at trace levels, often below the detection limit of standard organic analyses. Humans can detect levels of MIB as low as 5 to 10 parts per trillion. At 25 parts per trillion, the level of MIB is too high to suit many water consumers. The MIB levels reached higher than 70 parts per trillion at a Lake Michigan water plant intake during the summer of 1998.

The MIB and geosmin problem with respect to drinking water is primarily cosmetic, not a public health concern at current levels. However, it is desirable to remove the responsible malodorous water contaminants. The currently used methods are unable to consistently produce acceptable water.

Other possibilities for the algae-associated water impurities responsible for objectionable drinking water are potentially carcinogenic halogenated organic substances. These substances, such as trihalomethanes, are derived from the combination of chlorine and bromine with organic halogenated components of the water. The removal of these halogenated organic decomposition products is desirable for cosmetic and public health reasons.

Drinking water has two important characteristics, its organoleptic qualities and its mineral matrix. The organoleptic qualities define the odor and flavor of the water. The mineral matrix is defined by the mineral composition of the water, which contributes to its taste, "hardness" and nutritional value.

A conventional process for removing organic contaminants from fresh water involves treating the -water with powdered or granulated activated carbon. Activated carbon adsorbs organic molecules. Activated carbon treatments are routinely used in home and commercial water purification filters.

The routine activated carbon treatment has been found to be insufficiently effective for removing the algae-associated odorant from fresh water taken from Lake Michigan during periods of peak algae growth.

Another standard water purification process, reverse osmosis, was also found to be insufficiently effective for removing the algae-associated bad odor from Lake Michigan water. In reverse osmosis, water passes through a membrane barrier that retains many water solutes.

Another standard water purification process, ozonolysis, was found to be incompletely effective for removing the algae-associated bad flavor. During ozonolysis, organic components are oxidized to carbon dioxide and water and other degradation products. The process was unable to reliably remove the bad algae-associated odorant from Lake Michigan water.

Chlorination is a conventional water treatment process, which also oxidizes organic components. Chlorination has also failed to suitably remove the algae-associated odorant from Lake Michigan drinking water.

There remains a need for a convenient and effective process for removing the objectionable algae-associated organic odorants from fresh water.

The present invention, as is discussed hereinafter, contemplates the use of cyclodextrins to remove the algae-associated odorant from water. "Cyclodextrins: A Breakthrough for Molecular Encapsulation", a 1996 advertising brochure for CAVITRON™ (cyclodextrins) from Cerestar USA, Inc. (Hammond, Ind.) describes several uses for cyclodextrin to remove organic molecules. Those uses include the removal of organic molecules from citrus juices, coffee and tea, perspiration and breath.

The present invention has several benefits and advantages.

One benefit of a process of the present invention is its effectiveness in removing algae-associated odorant from fresh water.

An advantage of a process of the present invention is the large amount of water that can be treated before the resin capacity is reached, necessitating its replacement or regeneration.

Another benefit of a process of the present invention is its ability to remove the objectionable flavor without significantly disturbing the mineral matrix of the water.

Another advantage of a process of the present invention is its ability to remove the objectionable flavor without adding any dissolved chemicals to the treated water.

Still further benefits and advantages of the present invention will become apparent to the skilled worker from the disclosure that follows.

BRIEF SUMMARY OF THE INVENTION

In a process of the invention, an algae-associated odorant is removed from fresh water as described below to provide water with a diminished amount of the odorant. Fresh water having an algae-associated odorant is contacted with cyclodextrin to form a first sorbent/mobile phase admixture. That contact is maintained for a time period sufficient for the cyclodextrin to sorb the algae-associated odorant. Upon sorption of the algae-associated odorant, a second sorbent/ mobile phase admixture is formed containing algae-associated odorant-bound cyclodextrin and treated water having a diminished amount of the algae-associated odorant. The odorant-bound cyclodextrin particles are separated from the treated water to provide water having a diminished amount of the algae-associated odorant.

In various embodiments of the invention, the algae-associated odorant comprises 2-methyl isoborneol, geosmin, halogenated organic decomposition products or a mixtures thereof.

In a contemplated process, the cyclodextrin is α-, β- or γ-cyclodextrin, their derivatives or a mixture thereof, preferably β-cyclodextrin or β-cyclodextrin derivative.

In a contemplated process, the algae-associated odorant is removed from the fresh water at any stage of a water treatment process, including before or after disinfecting. When fresh water is treated to become potable water for consumption, treatment by a process of the invention is preferably after disinfection. Also contemplated is the removal of an algae-associated odorant before or after treatment with activated carbon, preferably after treatment with activated carbon. Most preferably, an algae-associated odorant is removed by a process of the invention as a final water treatment-polishing step.

In one embodiment of the invention, fresh water is treated at the point of consumption, for example in-home use to remove algae-associated odorant from the tap water.

In another embodiment of the invention, the cyclodextrin is recycled. Preferably, the odorant-bound cyclodextrin is recycled by steam treatment as follows. Algae-associated odorant-bound cyclodextrin is contacted with steam. That contact is maintained for a time period sufficient to desorb the algae-associated odorant from the cyclodextrin. A stationary/mobile phase admixture of a waste solution is thus formed containing an algae-associated odorant and regenerated cyclodextrin. The regenerated cyclodextrin is separated from the waste solution.

In another embodiment of the invention, water is treated by a contemplated process from which the removal of algae-associated odorant is desired without also removing minerals and bacteria, or changing the pH value, such as water recycled into a garden pond, fish pond or fish hatchery.

DETAILED DESCRIPTION OF THE INVENTION

In a process of the invention, an algae-associated odorant is removed from fresh water. Fresh water having an algae-associated odorant is contacted with cyclodextrin to form a sorbent/mobile phase admixture. That contact is maintained for a time period sufficient for the cyclodextrin to sorb the algae-associated odorant. Upon sorption of the algae-associated odorant a second sorbent/mobile phase admixture is formed containing algae-associated odorant-bound cyclodextrin and treated water having a diminished amount of the algae-associated odorant. The odorant-bound cyclodextrin is separated from the treated water to provide water having a diminished amount of algae-associated odorant.

The term "algae-associated odorant" refers to the organic foul-smelling water contaminants that are associated with or concomitant with the growth of algae in a fresh water source. Typically, the algae-associated organic molecule is a metabolite of the algae. The exact molecular structure can vary as explained below.

In the water environment, a metabolite can be converted to another molecular structure by the action of halides, sunlight, and inorganics, among other naturally occurring catalysts and reactants. A metabolite can also be converted by the action of various microbes also present in the water environment. The chlorination of the water to kill microbes can also cause the changes in the molecular structure of the metabolite, generating halogenated organic decomposition products such as trihalomethane. The conversion can cause the decomposed metabolite to have a more noticeable odor. The algae metabolites and their derivatives are "algae-associated".

The objectionable flavor has been associated inter alia with 2-methylisoborneol ("MIB" herein, shown as I below), also known as 1,2,7,7-tetramethyl-exo-bicyclo[2,2,1] heptan-2-ol, and with geosmin (shown as II below), also known as octahydro-4,8a-dimethyl-4a(2H)-naphthalenol or 1,10-trans-dimethyl-trans-(9)-decalol.

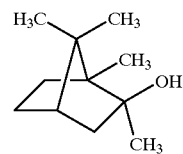

I

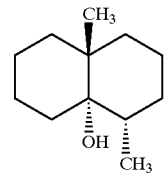

II

In various embodiments of the invention, the algae-associated odorant comprises 2-methyl isoborneol, geosmin, halogenated decomposition products or a mixture thereof.

The following Example shows that a β-cyclodextrin was useful for removing the algae-associated odorant(s) from water.

The term "fresh water" is intended to encompass water that is both potable and non-potable, ground water and surface water such as that used for drinking or on crops or in ponds used to farm fish. "Fresh water" is also intended to encompass water at any stage of a water treatment process. A "potable water treatment process" is the generation of water that is suitable for human consumption. Water treatment processes include sedimentation, coagulation (e.g. mixing with a coagulant, flocculation, and clarification), filtration (e.g. through sand, diatomaceous earth or coal), disinfecting (e.g. by chlorination), activated carbon (granular or powdered), water softening, and aeration.

When MIB or geosmin is the odorant, the "musty" or "weedy" odor and flavor resides not only in the water but also in the fish grown therein. It is contemplated that the term "fresh water" also refers to the recirculation water of fish tanks, ponds and fish farms. The treatment of the recirculating water (e.g. filtration, activated carbon, aeration) is not a "potable water treatment process" as used herein.

Cyclodextrins are a class of molecules that form molecular cavities. Cyclodextrins are studied extensively in the chemical sub-field of "Host-Guest" chemistry. The cyclodextrin serves a molecular "host" for the "guest" molecule that complexes in the cavity of the cyclodextrin.

Cyclodextrins are cyclic, nonreducing oligosaccharides. Alpha cyclodextrins (α-cyclodextrins) are made up of six glucopyranose rings, beta cyclodextrins (β-cyclodextrins) are made up of seven glucopyranose rings, and gamma cyclodextrins (γ-cyclodextrins) are made up of eight glucopyranose rings.

The size of the cavity varies with the kind of cyclodextrin. The cavity is about 5 angstroms (Å, 1 Å=$10^{-1}$ nm) in diameter for α-cyclodextrin, 6 angstroms in diameter for β-cyclodextrin, and 8 angstroms in diameter for γ-cyclodextrin. In a contemplated process, the cyclodextrin is preferably a β-cyclodextrin.

When the "guest" is resident in the cavity of the "host" cyclodextrin, an inclusion complex is formed. The inclusion complex is held together by a combination of weak binding forces. The weak forces include hydrophobic interactions, Van der Waals forces, London dispersion forces, and hydrogen bonding. Energetic considerations also contributing to the formation of an inclusion complex are solvation energy and conformational strain.

The affinity of a particular "guest" molecule for a cyclodextrin "host" is a complex compendium of these weak binding forces and energetics. The contemplated binding of the algae-associated odorant in the presence of water being contacted with the cyclodextrin particle is a result of this affinity. The algae-associated odorant does not have to fit completely into the pocket to bind. Similarly, it may be the case that more than one odorant molecule binds in a single cyclodextrin cavity at once.

Cyclodextrins are usually water-soluble, having certain hydroxyl groups exposed to solvent. The cavity is hyrophobic in nature. A contemplated cyclodextrin is preferably a cyclodextrin derivative that has additional properties such as high molecular weight, or water-insolubility. The term "cyclodextrin" as used herein encompasses modified cyclodextrins as well.

Water-soluble or water-insoluble cyclodextrins can be used in a process of the invention. As used herein, the phrase "sorbent phase" is used to refer to the cyclodextrin in any form (water-soluble or water-insoluble, odorant-bound or not).

Preferably, the water-soluble cyclodextrin is cross-linked to a water-soluble or water-insoluble polymer by methods well known in the art. The water-soluble or water-insoluble polymer acts as a chaperone to the cyclodextrin or a cyclodextrin inclusion complex with an algae-associated odorant. Exemplary methods include the use of an isocyanate cross-linker (e.g. phenylisocyanate), epoxide (e.g. epichlorohydrin) or a dicarboxylic acid cross-linker (e.g. maleic anhydride or 1,6-hexane dicarboxylic acid). An epichlorohydrin-linked cyclodextrin is particularly preferred.

A preferred water-soluble form of cyclodextrin includes cyclodextrin polymer cross-linked to a high molecular weight water-soluble polymer. A particularly preferred water-soluble high molecular weight polymer is polyethylene glycol cross-linked via an ether linkage to one or more cyclodextrins.

The use of a high molecular weight water-soluble form of cyclodextrin provides a simple physical way to separate the cyclodextrin from the odorant-depleted water at will. In a contemplated embodiment, a vessel contains the high molecular weight water-soluble cyclodextrin. The cyclodextrin is contacted with odorant-containing water to be treated in the vessel. The odorant-depleted treated water can be separated from the high molecular weight water-soluble cyclodextrin by passing the water through a membrane having a molecular weight cut-off lower than the high molecular weight water-soluble cyclodextrin. Such membranes are common in the water treatment arts, and are used for such processes as reverse osmosis purification.

In one contemplated embodiment, a process of the invention is carried out in a reverse osmosis apparatus as part of a usual reverse osmosis treatment, using the reverse osmosis membrane. In an alternative embodiment, a process of the invention is carried out in a reverse osmosis apparatus fitted with a higher flow low molecular weight cutoff membrane. Other vessels and apparati to be used with a process of the invention are readily apparent to a person skilled in the art.

Contemplated water-insoluble forms of cyclodextrin include cyclodextrin polymer formed into insoluble resin beads by cross-linking cyclodextrin to an insoluble support, such as a polystyrene bead, by methods well known in the art.

Another water-insoluble form of cyclodextrin described in an example of the invention below, is β-cyclodextrin cross-linked by epichlorohydrin obtained from Cerestar USA, Inc. in Hammond, Ind. (CAVITRON™ 824NO β-cyclodextrin polymer, lot number F-8071, a proprietary formula). That cross-linked β-cyclodextrin was insoluble in water, forming a phase having consistency of a slurry.

The use of a water-insoluble form of cyclodextrin provides a simple physical way to separate the cyclodextrin from the water at will. In a contemplated embodiment, a vessel contains the water-insoluble cyclodextrin. A sorbent/mobile phase admixture can be separated by removing the sorbent phase from the mobile phase or by removing the mobile phase from the sorbent phase.

In one embodiment of this invention, the vessel containing the insoluble cyclodextrin is a column of a type common in the art, through which the odorant-containing contacting water is flowed. The water flow through the column is preferably assisted by gravity, pump (at either end), or pressure. With this arrangement, separation of a sorbent/mobile phase admixture is preferably effected by removing the mobile phase from the sorbent phase.

In another embodiment of the invention, the vessel containing the soluble or insoluble cyclodextrin is a porous bag ("teabag") through which the contacting odorant-containing water can passively flow or be forced, but through which the cyclodextrin cannot pass. With this arrangement, separation of a sorbent/mobile admixture is preferably effected by removing the bound phase from the mobile phase.

In still another embodiment of the invention, the cyclodextrin is fixed onto a stirrer that is moved through the algae-associated odorant-containing contacting water to be treated. With this arrangement, separation of a sorbent/mobile phase admixture is effected by removing the stirrer (sorbent phase) or by removing the odorant-depleted water phase (mobile phase).

The contact between the water and the cyclodextrin is maintained for a time period sufficient to allow the cyclodextrin to sorb the algae-associated odorant(s). That time is usually relative short, on the order of a few seconds to a few minutes. When a column is used, the flow rate of water through the column determines the "residence time" of water in the column bed, and thus the contact time.

The required contact tine depends upon the type of vessel used. A contact time of at least 15 seconds is preferred in order to permit the algae-associated odorant to be sorbed by the cyclodextrin. Removal is sufficient upon a contact time of an hour, though the contact can be longer if desired. Preferably, the contact is maintained for between 1 to 10 minutes. With the "teabag" method, significantly longer contact times (up to days depending on the relative volumes of water to cyclodextrin sorbent) are required if the teabag is not moved efficiently through the solution.

The result of the contact for a sufficient period of time is a second sorbent/mobile phase admixture. In the sorbent phase a portion, preferably essentially all, of the algae-associated odorant is sorbed by the cyclodextrin. In the newly-formed mobile phase, the water is at least partially depleted, and preferably completely depleted or is free of algae-associated odorant. The second sorbent and mobile phases are separated as described above.

In a contemplated potable water treatment process, the algae-associated odorant is removed from the fresh water at any stage of a water treatment process, including before or after disinfecting. Preferably, algae-associated odorant is removed after fresh water to be used as potable water is disinfected. As previously described, there are several ways to disinfect fresh water.

Also contemplated is the removal of an algae-associated odorant before or after treatment with activated carbon, preferably the algae-associated odorant is removed after treatment with activated carbon.

In a process for treating pond or fishery water, treatment by a process of the invention is contemplated with or without an additional water treatment. Preferably, however, there is also an activated carbon treatment. As above, water treatment by a process of the invention can be before or after the carbon treatment, preferably the algae-associated odorant is removed after treatment with activated carbon. A filtration step is also preferred before treatment by a process of the invention to remove particulates.

Most preferably, an algae-associated odorant is removed by a process of the invention as a final water treatment "polishing step". Such a polishing step can apply to a potable water treatment or a water treatment for uses other than human consumption. Use of a process of the invention after the other treatments will maximize the amount of water that is treated before the sorption capacity of the cyclodextrin is reached.

Once the sorption capacity of the cyclodextrin is reached, the cyclodextrin is unable to effectively sorb more algae-associated odorant, and the water maintains the odor. In another embodiment of the invention, the water-insoluble cyclodextrin is recycled.

There are several known methods in the art to disrupt a host-guest cyclodextrin inclusion complex. Raising the pH of a solution in contact with the cyclodextrin to a pH value of at least 8 causes disruption of the cyclodextrin cavity. After separation of the sorbed odorant from the disrupted cyclodextrin using the separation methods described for its sorption, the pH can be returned to reassemble the regenerated cyclodextrin.

Another way to regenerate ododrant-bound cyclodextrin is using steam. The odorant-bound cyclodextrin is recycled by steam treatment as follows. Algae-associated odorant-bound cyclodextrin is contacted with steam. That contact is maintained for a time period sufficient to desorb the algae-associated odorant from the cyclodextrin.

The steam can be sparged into a solution containing the cyclodextrin (water-soluble or water-insoluble forms). The algae-associated odorant is released from the cyclodextrin, dissolving in the steam or the hot water thus formed, generating a mobile phase (gaseous or liquid). A third sorbent/mobile phase admixture of a waste solution is thus formed containing an algae-associated odorant and regenerated cyclodextrin. The regenerated cyclodextrin is separated from the waste solution. Preferably, the third sorbent/mobile phase admixture is separated while the temperature of the mobile phase is still well above ambient temperature at standard pressure (well above 20 degrees Celsius), most preferably between 70 and 100 degrees Celsius.

Still another way to displace the algae-associated odorant from the cyclodextrin cavity is by solvent exchange. For example the odorant-bound cyclodextrin is contacted with butanol.

EXAMPLE 1

Removal of Algae-Associated Odorant From Lake Michigan Tap Water

Water-insoluble β-cyclodextrin (CAVITRON™ 824NO, Cerestar USA, Inc., Hammond, Ind., lot number F-8071, proprietary formula, epichlorohydrin cross-linked β-cyclodextrin) was hydrated in distilled, deionized water. Swelled water-insoluble cyclodextrin (about 100 mL) was poured into a glass column about 2.5 cm in diameter and 40 cm in height to form a column volume of about 100 mL.

Tap water from a Chicago water treatment plant, having an obvious bad odor, was contacted with the water-insoluble cyclodextrin by flowing the water through the cyclodextrin column at a rate of about 100 mL/minute (1 column volume per minute). The contact time of algae-associated odorant-containing water with the cyclodextrin was about one minute. The effluent water had no detectable bad odor.

EXAMPLE 2

Regeneration of Cyclodextrin Resin

The capacity of the cyclodextrin sorbent in terms of the volume of water treated depends on the initial level of odorant in the challenge water. In challenge water containing 25–75 parts per trillion of MIB, several thousand (2,000–20,000 column volumes) can be treated by the column described in Example 1, i.e., 200–2000 liters of MIB containing water.

When cyclodextrin sorbent used in accordance with the instant invention no longer removes algae-associated odors from challenge water, it is considered saturated. Saturated cyclodextrin sorbent may be regenerated and reused repeatedly by sparging with live steam which serves to strip algae associated odorants as a steam vapor.

This steam vapor is advantageously condensed outside the vessel containing the cyclodextrin sorbent. The steam condensate thus contains a concentrate of algae associated odorants physically removed from cyclodextrin sorbent. Steam sparging is continued until vapors leaving the system are free of malodorous compounds. Upon cooling to ambient room temperatures, the regenerated cyclodextrin sorbent is ready for reuse.

EXAMPLE 3

Removal of Algae-Associated Odorant Using a Water-Soluble Cyclodextrin

A water-soluble β-cyclodextrin (CAVITRON™, Cerestar USA, Inc., Hammond, Ind.) is cross-linked to polyethylene glycol (average molecular weight 15,000, Aldrich Chemical Company, Milwaukee, Wis.) to form a high molecular weight water-soluble β-cyclodextrin. A preferred cross-linking reagent to prepare a high molecular weight, water-soluble cyclodextrin is epichlorchydrin (Aldrich Chemical Company, Milwaukee, Wis.).

Thus, for example, 150 grams (0.01 mole) of anhydrous α,o-dihydroxy polyethylene glycol (MW 15,000) is reacted with of potassium t-butoxide (0.02 mole) as a slurry in t-butanol followed by careful, dropwise addition of epichlorohydrin (0.02 mole) while maintaining a reaction temperature of 10–20 degrees Celsius. The bis-epoxylated polyethylene glycol product in t-butanol is vacuum-concentrated to a heavy oil and solid potassium chloride in a rotary evaporator.

The epoxylated polyethylene glycol is transferred to a 12-liter vessel containing a solution of water (10 L), β-cyclodextrin (0.02 moles), and sodium carbonate (0.04 moles). The reaction mixture is stirred overnight (about 16 hours) while maintaining a temperature of 60 degrees Celsius by means of an external heating mantle. At the end of the reaction period, the mixture is steam-sparged, as in Example 2 above, in order to rid the cyclodextrin/polyethylene glycol conjugate adduct of residual t-butanol, leaving a high molecular weight water-soluble cyclodextrin.

The now homogeneous mixture is dialyzed against a 10,000 molecular weight cutoff membrane (a hollow fiber bundle is preferred). The molecular weight of the β-cyclodextrin/polyethylene glycol conjugate is approximately 17,000 when both ends of the polyethylene glycol contain a β-cyclodextrin moiety.

Water contaminated with algae-associated odorant is contacted with high molecular weight water-soluble β-cyclodextrin to form a first sorbent/mobile phase. The contact is maintained for several minutes, allowing the cyclodextrin to sorb the algae-associated odorant, forming a second sorbent/mobile phase admixture.

The second sorbent/mobile phase admixture containing the algae-associated odorant-bound cyclodextrin-polyethylene glycol conjugate is dialyzed against a 10,000 molecular weight cut-off dialysis membrane to separate the odorant-bound β-cyclodextrin. Water permeating the membrane is free of algae-associated odorant, but still contains natural, low molecular weight dissolved minerals, thus maintaining the mineral matrix of the water.

The algae-associated odorant is thus separated from contaminated water on the basis of molecular weight through an affinity sorbent-mediated process of the invention.

From the foregoing, it will be observed that numerous modifications and variations can be effected without departing from the true spirit and scope of the present invention. It is to be understood that no limitation with respect to the specific examples presented is intended or should be inferred. The disclosure is intended to cover by the appended claims modifications as fall within the scope of the claims.

What is claimed is:

1. A process for removing algae-associated odorant from fresh water comprising the steps of:
   (a) contacting fresh water having an algae-associated odorant with cyclodextrin cross-linked to a water soluble polymer to form a first sorbent/mobile phase admixture;
   (b) maintaining said contact for a time period sufficient for the cross-linked cyclodextriu to sorb the algae-associated odorant to form a second sorbent/mobile phase admixture comprising algae-associated odorant-bound cross-linked cyclodextrin and treated water having a diminished amount of the algae-associated odorant; and
   (c) separating the odorant-bound cross-linked cyclodextrin from the treated water to provide algae-associated odorant-depleted fresh water.

2. The process according to claim 1 further comprising the step of:
   (d) recycling the odorant-bound cross-linked cyclodextrin by
       (i) contacting the cross-linked cyclodextrin bound to algae-associated odorant with steam;
       (ii) maintaining said contact for a time period sufficient to desorb the algae-associated odorant from the cross-linked cyclodextrin to form a third sorbent/mobile phase admixture of a waste solution comprising an algae-associated odorant and regenerated cross-linked cyclodextrin; and
       (iii) separating the regenerated cross-linked cyclodextrin from the waste solution.

3. A process for removing 2-methylisoborneol from fresh water comprising the steps of:
   (a) contacting fresh water containing 2-methylisoborneol with cyclodextrin cross-linked to a water soluble polymer to form a first sorbent/mobile admixture;
   (b) maintaining said contact for a time period sufficient for the cross-linked cyclodextrin to sorb the 2-methylisoborneol to form a second sorbent/mobile phase admixture comprising 2-methylisoborneol-bound cross-linked cyclodextrin and treated water having a diminished amount of 2-methylisoborneol; and
   (c) separating the 2-methylisoborneol-bound cross-linked cyclodextrin from the treated water to provide 2-methylisoborneol-depleted fresh water.

4. A process for removing geosmln from fresh water comprising the steps of:
   (a) contacting fresh water containing geosmin with cyclodextrin cross-linked to a water soluble polymer to form a first sorbent/mobile admixture;
   (b) maintaining said contact for a time period sufficient for the cross-linked cyclodextrin to sorb the geosmin to form a second sorbent/mobile phase admixture comprising geosmin-bound cross-linked cyclodextrin and treated water having a diminished amount of geosmin; and
   (c) separating the geosmin-bound cross-linked cyclodextrin from the treated water to provide geosmin-depleted fresh water.

5. A process for removing algae-associated odorant from fresh water comprising the steps of:
   (a) contacting fresh water having an algae-associated odorant with β-cyclodextrin cross-linked by epichlorohydrin to form a first sorbent/mobile phase admixture;
   (b) maintaining said contact for a time period sufficient for the cyclodextrin to sorb the algae-associated odorant to form a second sorbent/mobile phase admixture comprising algae-associated odorant-bound cross-linked cyclodextrin and treated water having a diminished amount of the algae-associated odorant; and
   (c) separating the odorant-bound cross-linked cyclodextrin from the treated water to provide algae-associated odorant-depleted fresh water.

6. The process according to claim 5 wherein said water with an algae-associated odorant is contacted in step (a) after being disinfected.

7. The process according to claim 5 wherein said water with an algae-associated odorant is contacted in step (a) before being disinfected.

8. The process according to claim 5 wherein said water with an algae-associated odorant is contacted in step (a) after being treated with activated carbon.

9. The process according to claim 5 wherein the treated water is free of the algae-associated odorant.

10. The process according to claim 5 wherein said water with an algae-associated odorant is contacted in step (a) before being treated with activated carbon.

11. The process according to claim 5 further comprising the step of:
   (d) recycling the odorant-bound cross-linked cyclodextrin by
      (i) contacting the cross-linked cyclodextrin bound to algae-associated odorant with steam;
      (ii) maintaining said contact for a time period sufficient to desorb the algae-associated odorant from the cross-linked cyclodextrin to form a third sorbent/mobile phase admixture comprising a waste solution containing an algae-associated odorant and regenerated cross-linked cyclodextrin; and
      (iii) separating the regenerated cross-linked cyclodextrin from the waste solution.

12. The process according to claim 5 wherein the algae-associated odorant is 2-methyl isoborneol.

13. The process according to claim 5 wherein the algae-associated odorant is geosmin.

14. A process for removing 2-methylisoborneol from fresh water comprising the steps of:
   (a) contacting fresh water containing 2-methyl isoborneol with β-cyclodextrin cross-linked by epichlorohydrin to form a first sorbent/mobile admixture;
   (b) maintaining said contact for a time period sufficient for the cross-linked cyclodextrin to sorb the 2-methylisoborneol to form a second sorbent/mobile phase admixture comprising 2-methylisoborneol-bound cyclodextrin and treated water having a diminished amount of 2-methylisoborneol; and
   (c) separating the 2-methylisoborneol-bound cross-linked cycloctextrin from the treated water to provide algae-associated odorant-depleted fresh water.

15. The process according to claim 4 wherein the treated water is free of 2-methyl isoborneol.

16. A process for removing geosmin from fresh water comprising the steps of:
   (a) contacting fresh water containing geosmin with β-cyclodextrin cross-linked by epichlorohydrin to form a first sorbent/mobile admixture;
   (b) maintaining said contact for a time period sufficient for the cross-linked cyclodextrin to sorb the geosmin to form a second sorbent/mobile phase admixture comprising geosmin and treated water having a diminished amount of geosmin; and
   (c) separating the algae-associated odorant-depleted fresh water.

17. The process according to claim 16 wherein the treated water is free of geosmin.

18. A process for recycling insoluble cyclodextrin that have been used to remove an algae-associated odorant comprising the steps of:
   (a) contacting insoluble cyclodextrin binding an algae-associated odorant with steam;
   (b) maintaining said contact for a time period sufficient to desorb the algae-associated odorant from the cyclodextrin to form a sorbent/mobile phase admixture of a waste solution containing an algae-associated odorant and regenerated cyclodextrin; and
   (c) separating the regenerated cyclodextrin from the waste solution.

* * * * *